(12) United States Patent
Lin et al.

(10) Patent No.: US 11,791,466 B2
(45) Date of Patent: Oct. 17, 2023

(54) MODIFIED GRAPHITE AND PREPARATION METHOD THEREOF, SECONDARY BATTERY, BATTERY MODULE, BATTERY PACK, AND ELECTRICAL DEVICE

(71) Applicant: Contemporary Amperex Technology Co., Limited, Ningde City (CN)

(72) Inventors: Jianghui Lin, Ningde (CN); Yanjie Zhao, Ningde (CN); Xing Li, Ningde (CN); Haizu Jin, Ningde (CN)

(*) Notice: Subject to any disclaimer, the term of this patent is extended or adjusted under 35 U.S.C. 154(b) by 65 days.

(21) Appl. No.: 18/050,048

(22) Filed: Oct. 27, 2022

(65) Prior Publication Data

US 2023/0135504 A1    May 4, 2023

Related U.S. Application Data

(63) Continuation of application No. PCT/CN2021/114544, filed on Aug. 25, 2021.

(51) Int. Cl.
| | |
|---|---|
| *H01M 4/583* | (2010.01) |
| *H01M 4/62* | (2006.01) |
| *H01M 4/04* | (2006.01) |
| *H01M 10/0525* | (2010.01) |
| *H01M 4/02* | (2006.01) |

(52) U.S. Cl.
CPC ........ *H01M 4/583* (2013.01); *H01M 4/0404* (2013.01); *H01M 4/622* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | |
|---|---|---|
| 2011/0053050 A1 | 3/2011 | Lim et al. |
| 2022/0059845 A1 | 2/2022 | Kaai et al. |

FOREIGN PATENT DOCUMENTS

| | | |
|---|---|---|
| CN | 101547858 A | 9/2009 |
| CN | 113227180 A | 8/2021 |
| JP | 2015210931 A | 11/2015 |
| WO | 2020218049 A1 | 10/2020 |

OTHER PUBLICATIONS

International Search Report and Written Opinion received in PCT Application PCT/CN2021/114544 on May 10, 2022.

*Primary Examiner* — Carlos Barcena
(74) *Attorney, Agent, or Firm* — Kilpatrick Townsend & Stockton LLP

(57) ABSTRACT

Graphite and a preparation method thereof, a secondary battery containing the modified graphite, a battery module, a battery pack, and an electrical device are provided. In particular, the modified graphite according to this disclosure includes a graphite moiety and a binder moiety covalently linked to the graphite moiety. The binder moiety possesses a structure expressed as Formula (IV'). The modified graphite according to this disclosure solves the problem that the binder floats up during the preparation of the negative electrode plate of the secondary battery.

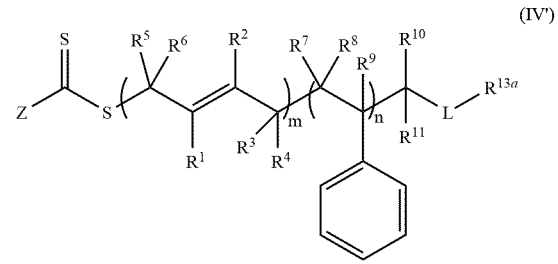

20 Claims, 5 Drawing Sheets

MODIFIED GRAPHITE AND PREPARATION METHOD THEREOF, SECONDARY BATTERY, BATTERY MODULE, BATTERY PACK, AND ELECTRICAL DEVICE

CROSS-REFERENCE TO RELATED APPLICATION

This application is a continuation of International Application PCT/CN2021/114544, filed on Aug. 25, 2021, and entitled "MODIFIED GRAPHITE AND PREPARATION METHOD THEREOF, SECONDARY BATTERY, BATTERY MODULE, BATTERY PACK, AND ELECTRICAL DEVICE", which is incorporated herein by reference in its entirety.

TECHNICAL FIELD

This disclosure relates to the technical field of lithium batteries, and in particular, to modified graphite and a preparation method thereof, a secondary battery, a battery module, a battery pack, and an electrical device.

BACKGROUND

In recent years, secondary batteries have been widely used in many fields. Currently, a binder in a negative electrode of a secondary battery is usually styrene-butadiene rubber (SBR), but a negative electrode plate that employs such a binder is prone to a problem of uneven distribution of the binder, thereby leading to deterioration of battery performance. In the prior art, such a problem is usually alleviated by adjusting coating and drying processes, but the problem is still not avoided.

In view of this, it is necessary to solve the problem of deterioration of battery performance caused by uneven distribution of the binder in the negative electrode of the secondary battery.

SUMMARY

Technical Problems to Be Hereby Solved

This disclosure is put forward in view of the foregoing problems, and aims to suppress distribution nonuniformity of a binder without reducing production efficiency, and in particular, to reduce the probability of floating of a negative binder (especially an SBR binder) so as to improve battery performance.

Technical Solutions to the Problems

To achieve the foregoing objectives, this disclosure provides a type of modified graphite and a preparation method thereof.

A first aspect of this disclosure provides a type of modified graphite, where the modified graphite includes a graphite moiety and a binder moiety covalently linked to the graphite moiety, and the binder moiety possesses a structure expressed as Formula (IV'):

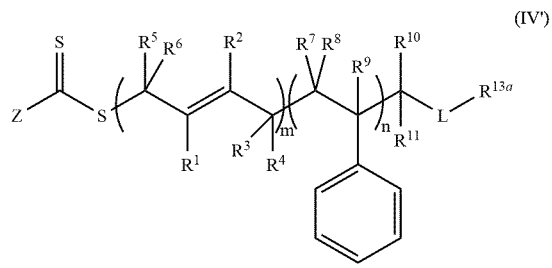

(IV')

In the formula above:

$R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkenyl, and aryl each are at least one selected from $C_1$ to $C_3$ alkyl, hydroxyl, amino, amido, cyano, carboxyl, or halogen; optionally, $R^1$ to $R^6$ each are independently selected from hydrogen, halogen, or substituent-free $C_1$ to $C_6$ alkyl, substituent-free or substituent-containing $C_6$ to $C_{20}$ aryl; and the substituent in the substituent-containing aryl is at least one selected from $C_1$ to $C_3$ alkyl or halogen;

$R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkylamino, alkenyl, and aryl each are at least one selected from hydroxyl, carboxyl, amino, amido, or halogen; optionally, $R^7$ to $R^9$ each are at least one independently selected from hydrogen, amino, substituent-free $C_1$ to $C_6$ alkyl, or substituent-free $C_1$ to $C_6$ alkylamino; and further optionally, $R^7$ to $R^8$ each are at least one independently selected from hydrogen, methyl, ethyl, dimethylamino, or 2-(N,N-diethylamino)ethyl, and $R^9$ is at least one selected from hydrogen, methyl, or ethyl;

$R^{10}$ represents linear or branched $C_1$ to $C_{12}$ alkyl, optionally linear or branched $C_1$ to $C_6$ alkyl, and further optionally methyl;

$R^{11}$ represents halogen or cyano, and optionally cyano;

Z is selected from linear or branched $C_1$ to $C_5$ alkylthio, and optionally methylthio, ethylthio, propylthio, butylthio, or pentylthio;

L represents linear or branched $C_1$ to $C_{12}$ alkylidene, optionally linear or branched $C_1$ to $C_6$ alkylidene, and further optionally methylene;

$R^{13a}$ represents #—COO—*, #—CH$_2$O—*, or #—NH—*, and # represents a position linked to L, and * represents a position linked to the graphite moiety; and a ratio of m to n is 1 to 100, optionally 1 to 50, and further optionally 1 to 13.

In this disclosure, the modified graphite includes a graphite moiety and a binder moiety covalently linked to the graphite moiety. A binder segment containing a special functional group is attached onto the surface of graphite particles to improve dispersity of graphite particles in a slurry, help alleviate the problem of floating of the binder in a subsequent process of preparing a negative electrode plate, and in turn, effectively enhance electronic conductivity and adhesion of a film layer in the negative electrode plate.

In any embodiment, m is an integer ranging from 500 to 15,000, and n is an integer ranging from 500 to 15,000.

In any embodiment, a number-average molecular weight (Mn) of the binder moiety of Formula (IV') is 30,000 to 3,000,000, optionally 50,000 to 2,000,000, and further optionally 300,000 to 1,000,000.

In any embodiment, structural units

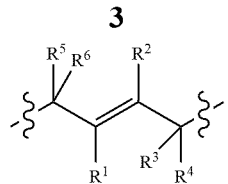

and

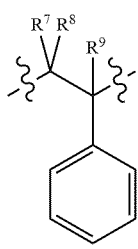

in the binder moiety are copolymerized in a random, blocked, and/or alternating manner, and optionally, in a blocked manner.

In any embodiment, the binder moiety in the modified graphite is selected from the following structures:

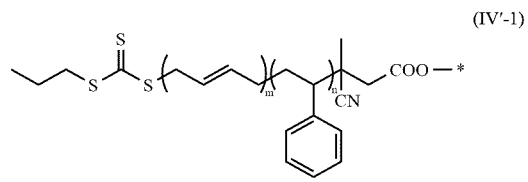
(IV'-1)

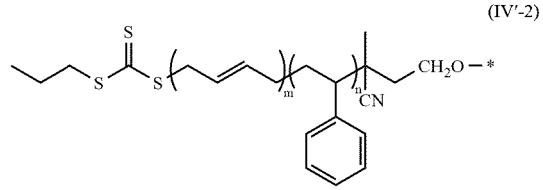
(IV'-2)

or

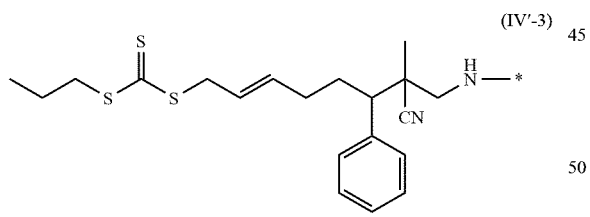
(IV'-3)

In the structures above, * represents a position at which the binder moiety is covalently linked to the graphite moiety.

In any embodiment, a mass ratio between the graphite moiety and the binder moiety is 85: 12 to 96.5: 0.5, and optionally 90: 7 to 96: 1. The mass ratio between the graphite moiety and the binder moiety is controlled to fall within the foregoing range, and therefore, the content of an active material in an electrode plate containing the modified graphite is moderate, an appropriate energy density of a battery is provided, and a good binding force is provided.

A second aspect of this disclosure provides a preparation method of modified graphite, including the following step:
leaving a binder compound to react with graphite in a solvent in the presence of a catalyst, where the binder compound possesses a structure expressed as Formula (IV):

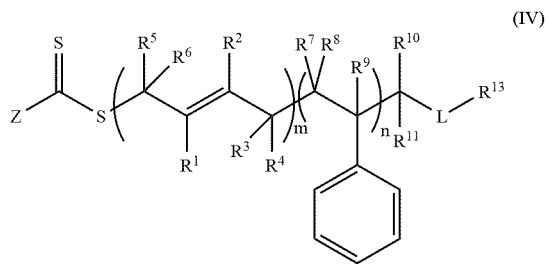
(IV)

In the formula above:
$R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkenyl, and aryl each are at least one selected from $C_1$ to $C_3$ alkyl, hydroxyl, amino, amido, cyano, carboxyl, or halogen; optionally, $R^1$ to $R^6$ each are independently selected from hydrogen, halogen, or substituent-free $C_1$ to $C_6$ alkyl, substituent-free or substituent-containing $C_6$ to $C_{20}$ aryl; and the substituent in the substituent-containing aryl is at least one selected from $C_1$ to $C_3$ alkyl or halogen;

$R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkylamino, alkenyl, and aryl each are at least one selected from hydroxyl, carboxyl, amino, amido, or halogen; optionally, $R^7$ to $R^9$ each are at least one independently selected from hydrogen, amino, substituent-free $C_1$ to $C_6$ alkyl, or substituent-free $C_1$ to $C_6$ alkylamino; and further optionally, $R^7$ to $R^8$ each are at least one independently selected from hydrogen, methyl, ethyl, dimethylamino, or 2-(N,N-diethylamino)ethyl, and $R^9$ is at least one selected from hydrogen, methyl, or ethyl;

$R^{10}$ represents linear or branched $C_1$ to $C_{12}$ alkyl, optionally linear or branched $C_1$ to $C_6$ alkyl, and further optionally methyl;

$R^{11}$ represents halogen or cyano, and optionally cyano;

Z is selected from linear or branched $C_1$ to $C_5$ alkylthio, and optionally methylthio, ethylthio, propylthio, butylthio, or pentylthio;

L represents linear or branched $C_1$ to $C_{12}$ alkylidene, optionally linear or branched $C_1$ to $C_6$ alkylidene, and further optionally methylene;

$R^{13}$ represents carboxyl, hydroxymethyl, or amino; and a ratio of m to n is 1 to 100, optionally 1 to 50, and further optionally 1 to 13.

In this disclosure, the graphite particles are made to react chemically, in a solvent in the presence of a catalyst, with the binder compound containing a special functional group, thereby modifying the surface of the graphite, and making the binder moiety of the graphite stably bound to the surface of the graphite particles.

In any embodiment, in the binder compound, m is an integer ranging from 500 to 15,000, and n is an integer ranging from 500 to 15,000.

In any embodiment, a number-average molecular weight of the binder compound is 30,000 to 3,000,000, optionally 50,000 to 2,000,000, and further optionally 300,000 to 1,000,000.

In any embodiment, structural units

[chemical structure with $R^1$, $R^2$, $R^3$, $R^4$, $R^5$, $R^6$]

and

[chemical structure with $R^7$, $R^8$, $R^9$ and phenyl group]

in the binder compound are copolymerized in a random, blocked, and/or alternating manner, and optionally, in a blocked manner.

In any embodiment, the binder compound is at least one selected from:

(IV-1)

[chemical structure with COOH, CN groups, m and n subscripts]

(IV-2)

[chemical structure with $CH_2OH$, CN groups, m and n subscripts]

or (IV-3)

[chemical structure with $NH_2$, CN groups, m and n subscripts]

In any embodiment, a pH value of the reaction is 4 to 7, and optionally 4.5 to 6. With the reaction pH controlled to fall within the foregoing range, an appropriate reaction rate can be achieved to make the reaction proceed smoothly.

In any embodiment, a mass ratio between the graphite and the binder compound is 85: 12 to 96.5: 0.5, and optionally 90: 7 to 96: 1.

In any embodiment, the reaction occurs at 20° C. to 40° C., and optionally 25° C. to 30° C.

A third aspect of this disclosure provides a negative electrode plate. The negative electrode plate includes a negative current collector and a negative material layer disposed on at least one surface of the negative current collector. The negative material layer includes the modified graphite according to the first aspect of this disclosure or the modified graphite formulated by the preparation method of modified graphite according to the second aspect.

A fourth aspect of this disclosure provides a secondary battery. The secondary battery includes the negative electrode plate according to the third aspect.

A fifth aspect of this disclosure provides a battery module. The battery module includes the secondary battery according to the fourth aspect.

A sixth aspect of this disclosure provides a battery pack. The battery pack includes at least one of the secondary battery according to the fourth aspect or the battery module according to the fifth aspect.

A seventh aspect of this disclosure provides an electrical device. The electrical device includes at least one of the secondary battery according to the fourth aspect, the battery module according to the fifth aspect, or the battery pack according to the sixth aspect.

Beneficial Effects

In contrast to the prior art, the modified graphite according to this disclosure achieves at least the following beneficial effects: The problem that the binder (such as SBR) migrates to the surface of the electrode plate and floats up in a drying process of the negative electrode plate is solved fundamentally, the binder in the electrode plate is made to be evenly distributed, the binding force of the film layer of the negative electrode plate is enhanced, and the storage performance and cycle performance of the battery are improved.

REFERENCE NUMERALS

Figure 1:
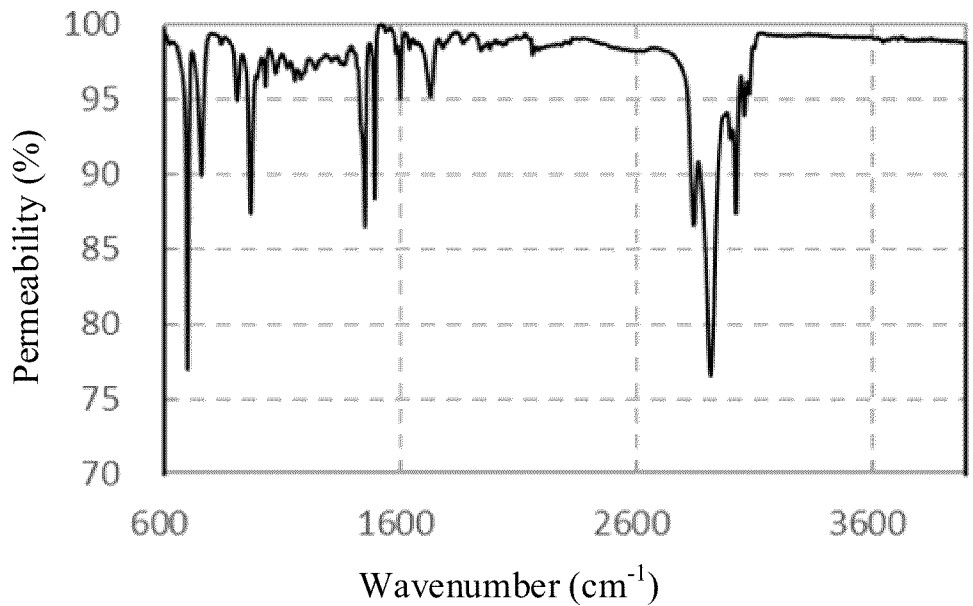
FIG. 1 shows an infrared spectrum of a binder compound prepared according to Embodiment 1.

1. battery pack; 2. upper box; 3. lower box; 4. battery module; 5. secondary battery; 51. housing; 52. electrode assembly; 53. cap assembly.

DETAILED DESCRIPTION OF EMBODIMENTS

The following describes in detail a preparation method of a binder compound and a binder compound so prepared, modified graphite and a preparation method thereof, a secondary battery, a battery module, a battery pack, and an electrical device according to embodiments of this disclosure with due reference to drawings. However, unnecessary details may be omitted in some cases. For example, a detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this disclosure, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and may be arbitrarily combined. That is, any lower limit may be combined with any upper limit to form a range.

Currently, a binder in a negative electrode of a secondary battery is usually styrene-butadiene rubber (SBR). However, the binder SBR is prone to migrate to the surface of the electrode plate (that is, the binder floats up) along with evaporation of a solvent during coating and drying of a negative material layer. Consequently, the distribution of the binder in the negative electrode plate is uneven. The amount of the binder on the side closer to the current collector is smaller. As a result, the binding force between an active material (graphite) layer and the current collector in the negative electrode plate is deficient, and even the active material layer is peeled off the current collector, thereby frustrating formation of a good electronic path, deteriorating battery performance, and making the battery capacity decline significantly.

In the prior art, the problem of binder floating is usually alleviated by adjusting the coating and drying processes of an electrode plate material, for example, by reducing a drying speed, extending a drying distance, performing multi-stage drying, and the like. However, the inventor finds that such measures can merely slightly alleviate the problem rather than significantly suppress or even avoid the floating of the binder. In addition, such measures greatly reduce production efficiency, increase equipment investment, and are not suitable for mass production.

In view of the foregoing problems, this disclosure provides such a modified graphite that a binder compound containing a special functional group is chemically bound to the surface of the graphite. Therefore, in a preparation process of a negative slurry, no free-state negative binder needs to be added, and dispersity of the graphite in the slurry is improved, thereby fundamentally solving the problem of the floating of the binder in the negative electrode of the secondary battery, enhancing the binding force of the film layer of the negative electrode plate, and effectively improving the storage performance and cycle performance of the battery.

Modified Graphite

A first aspect of this disclosure provides a type of modified graphite. The modified graphite includes a graphite moiety and a binder moiety covalently linked to the graphite moiety, and the binder moiety possesses a structure expressed as Formula (IV'):

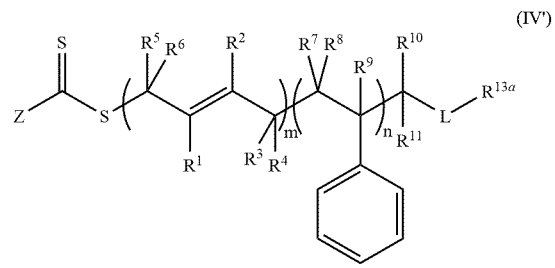

(IV')

In the formula above:

$R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkenyl, and aryl each are at least one selected from $C_1$ to $C_3$ alkyl, hydroxyl, amino, amido, cyano, carboxyl, or halogen; optionally, $R^1$ to $R^6$ each are independently selected from hydrogen, halogen, or substituent-free $C_1$ to $C_6$ alkyl, substituent-free or substituent-containing $C_6$ to $C_{20}$ aryl; and the substituent in the substituent-containing aryl is at least one selected from $C_1$ to $C_3$ alkyl or halogen;

$R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkylamino, alkenyl, and aryl each are at least one selected from hydroxyl, carboxyl, amino, amido, or halogen; optionally, $R^7$ to $R^9$ each are at least one independently selected from hydrogen, amino, substituent-free $C_1$ to $C_6$ alkyl, or substituent-free $C_1$ to $C_6$ alkylamino; and further optionally, $R^7$ to $R^8$ each are at least one independently selected from hydrogen, methyl, ethyl, dimethylamino, or 2-(N,N-diethylamino)ethyl, and $R^9$ is at least one selected from hydrogen, methyl, or ethyl;

$R^{10}$ represents linear or branched $C_1$ to $C_{12}$ alkyl, optionally linear or branched $C_1$ to $C_6$ alkyl, and further optionally methyl;

$R^{11}$ represents halogen or cyano, and optionally cyano;

Z is selected from linear or branched $C_1$ to $C_5$ alkylthio, and optionally methylthio, ethylthio, propylthio, butylthio, or pentylthio;

L represents linear or branched $C_1$ to $C_{12}$ alkylidene, optionally linear or branched $C_1$ to $C_6$ alkylidene, and further optionally methylene;

$R^{13a}$ represents #—COO—*, #—CH$_2$O—*, or #—NH—*, and # represents a position linked to L, and * represents a position linked to the graphite moiety; and a ratio of m to n is 1 to 100, optionally 1 to 50, and further optionally 1 to 13.

In this disclosure, the terms "covalently linked" or "covalently bound" or "linked by a covalent bond" and similar expressions are interchangeable, and mean that atoms, molecules, or moieties of a molecule are linked together by covalent bonds.

In this disclosure, the modified graphite includes a graphite moiety and a binder moiety covalently linked to the graphite moiety. The binder moiety includes a special functional group. Because a binder moiety is bound to the surface of the modified graphite according to this disclosure, no free-state binder needs to be added during the preparation of the electrode plate (especially the negative electrode plate), thereby fundamentally avoiding battery performance deterioration caused by floating of the binder (especially the SBR binder) during the coating and drying of the electrode plate.

In some embodiments, m is an integer ranging from 500 to 15,000, and n is an integer ranging from 500 to 15,000.

In some embodiments, a number-average molecular weight of the binder moiety of Formula (IV′) is 30,000 to 3,000,000, optionally 50,000 to 2,000,000, and further optionally 300,000 to 1,000,000.

In some embodiments, structural units

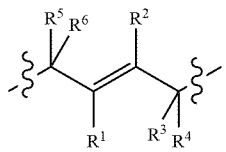

and

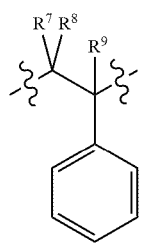

in the binder moiety are copolymerized in a random, blocked, and/or alternating manner, and optionally, in a blocked manner.

In some embodiments, the binder moiety in the modified graphite is selected from the following structures:

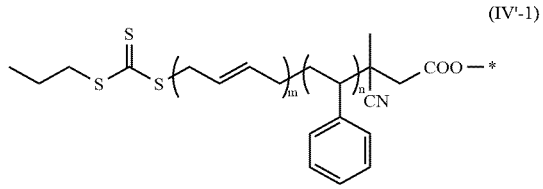
(IV′-1)

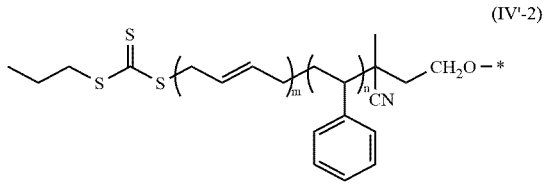
(IV′-2)

or

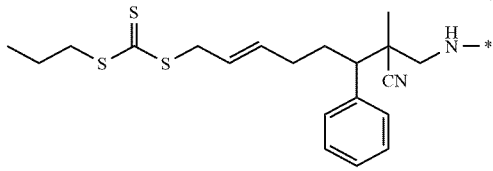
(IV′-3)

In the structures above, * represents a position at which the binder moiety is covalently linked to the graphite moiety.

With the preferred binder moieties selected above, the modified graphite according to this disclosure can further improve the battery performance.

In some embodiments, in the modified graphite according to this disclosure, a mass ratio between the graphite moiety and the binder moiety is 85: 12 to 96.5: 0.5, and optionally 90: 7 to 96: 1. In the modified graphite, the mass ratio between the graphite moiety and the binder moiety is controlled to fall within the foregoing range, and therefore, the content of an active material in an electrode plate containing the modified graphite is moderate, an appropriate energy density of a battery is provided, and a good binding force is provided.

In some embodiments, the graphite moiety is at least one of, but without being limited to, artificial graphite, natural graphite, soft carbon, hard carbon, or a modified graphite material thereof.

Method for Preparing the Modified Graphite

A second aspect of this disclosure provides a preparation method of modified graphite, including the following step: leaving a binder compound to react with graphite in a solvent in the presence of a catalyst.

The binder compound possesses a structure expressed as Formula (IV):

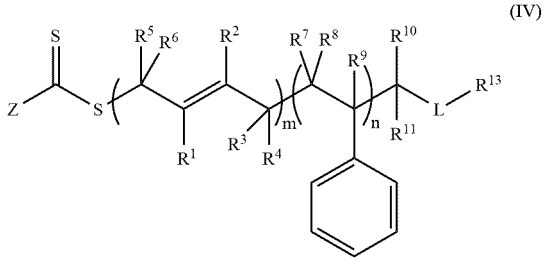
(IV)

In the formula above:

$R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkenyl, and aryl each are at least one selected from $C_1$ to $C_3$ alkyl, hydroxyl, amino, amido, cyano, carboxyl, or halogen; optionally, $R^1$ to $R^6$ each are independently selected from hydrogen, halogen, or substituent-free $C_1$ to $C_6$ alkyl, substituent-free or substituent-containing $C_6$ to $C_{20}$ aryl; and the substituent in the substituent-containing aryl is at least one selected from $C_1$ to $C_3$ alkyl or halogen;

$R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkylamino, alkenyl, and aryl each are at least one selected from hydroxyl, carboxyl, amino, amido, or halogen; optionally, $R^7$ to $R^9$ each are at least one independently selected from hydrogen, amino, substituent-free $C_1$ to $C_6$ alkyl, or substituent-free $C_1$ to $C_6$ alkylamino; and further optionally, $R^7$ to $R^8$ each are at least one independently selected from hydrogen, methyl, ethyl, dimethylamino, or 2-(N,N-diethylamino)ethyl, and $R^9$ is at least one selected from hydrogen, methyl, or ethyl;

$R^{10}$ represents linear or branched $C_1$ to $C_{12}$ alkyl, optionally linear or branched $C_1$ to $C_6$ alkyl, and further optionally methyl;

$R^{11}$ represents halogen or cyano, and optionally cyano;

Z is selected from linear or branched $C_1$ to $C_5$ alkylthio, and optionally methylthio, ethylthio, propylthio, butylthio, or pentylthio;

L represents linear or branched $C_1$ to $C_{12}$ alkylidene, optionally linear or branched $C_1$ to $C_6$ alkylidene, and further optionally methylene;

$R^{13}$ represents carboxyl, hydroxymethyl, or amino; and a ratio of m to n is 1 to 100, optionally 1 to 50, and further optionally 1 to 13.

In any embodiment, in the binder compound, m is an integer ranging from 500 to 15,000, and n is an integer ranging from 500 to 15,000.

In this disclosure, the graphite particles are made to react chemically, in a solvent in the presence of a catalyst, with the binder compound containing a special functional group, thereby modifying the surface of the graphite, and making the binder moiety of the graphite stably bound to the surface of the graphite particles.

In some embodiments, a number-average molecular weight of the binder compound is 30,000 to 3,000,000, optionally 50,000 to 2,000,000, and further optionally 300,000 to 1,000,000.

In some embodiments, structural units

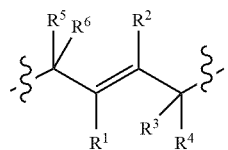

and

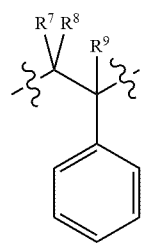

in the binder compound are copolymerized in a random, blocked, and/or alternating manner, and optionally, in a blocked manner.

In some embodiments, the binder compound is at least one selected from:

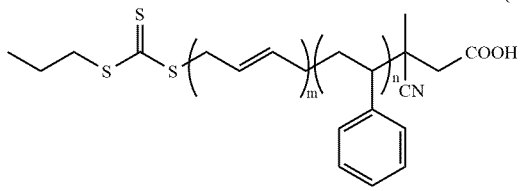

(IV-1)

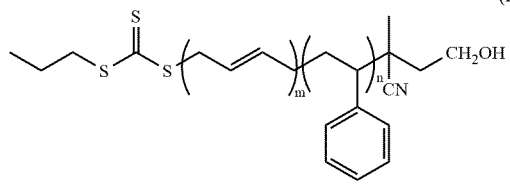

(IV-2)

or

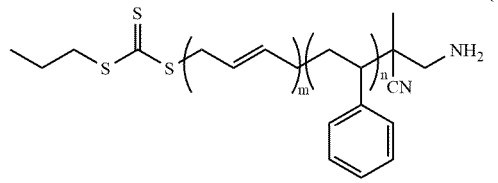

(IV-3)

In some embodiments, a pH value of the reaction is 4 to 7, and optionally 4.5 to 6. The inventor finds that, with the reaction pH controlled to fall within the foregoing range, an appropriate reaction rate can be achieved to make the reaction proceed smoothly.

In some embodiments, in a graphite modification method, a mass ratio between the graphite and the binder compound is 85: 12 to 96.5: 0.5, and optionally 90: 7 to 96: 1.

In some embodiments, the catalyst is pyridine. In some embodiments, the solvent is at least one of dichloromethane, tetrahydrofuran, dimethylformamide, or dimethyl sulfoxide. In some embodiments, the reaction occurs at 20° C. to 40° C., and optionally 25° C. to 30° C.

In some embodiments, in the preparation method according to the second aspect of this disclosure, the reaction between the graphite and the binder compound continues for 2 to 4 hours, and optionally 2 hours.

In some embodiments, the preparation method according to the second aspect of this disclosure may employ any graphite with a surface containing a group reactive to carboxyl, hydroxyl, or amino.

In some embodiments, the graphite includes at least one of, but without being limited to, artificial graphite, natural graphite, soft carbon, hard carbon, or a modified graphite material thereof.

Method for Preparing a Binder Compound

This disclosure further discloses a method for preparing a binder compound, including the following step:

Step (i): Leaving a compound of Formula (I), a compound of Formula (II), and a chain transfer agent of Formula (III) to react in a solvent in the presence of an initiator.

The compound of Formula (I) is:

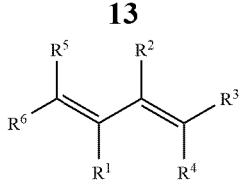

(I)

In the formula above, $R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkenyl, and aryl each are at least one selected from $C_1$ to $C_3$ alkyl, hydroxyl, amino, amido, cyano, carboxyl, or halogen.

The compound of Formula (II) is:

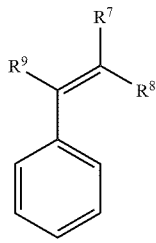

(II)

In the formula above, $R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substituent-containing $C_2$ to $C_6$ alkenyl, or substituent-free or substituent-containing $C_6$ to $C_{20}$ aryl, where substituents in the substituent-containing alkyl, alkoxyl, alkylamino, alkenyl, and aryl each are at least one selected from hydroxyl, carboxyl, amino, amido, or halogen.

The chain transfer agent of Formula (III) is:

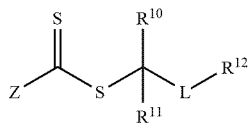

(III)

In the formula above:

Z is selected from linear or branched $C_1$ to $C_5$ alkylthio, and optionally methylthio, ethylthio, propylthio, butylthio, or pentylthio;

$R^{10}$ represents linear or branched $C_1$ to $C_{12}$ alkyl, optionally linear or branched $C_1$ to $C_6$ alkyl, and further optionally methyl;

$R^{11}$ represents halogen or cyano, and optionally cyano;

L represents linear or branched $C_1$ to $C_{12}$ alkylidene, optionally linear or branched $C_1$ to $C_6$ alkylidene, and further optionally methylene; and $R^{12}$ is selected from carboxyl.

The applicant finds that: In the binder compound formulated by the foregoing preparation method, due to a reactive group existent at an end of the binder compound, the binder compound can be bound to the surface of the graphite to modify the graphite, thereby alleviating the problem of floating of the binder during the coating and drying of the negative electrode plate, improving uniformity of distribution of the binder in the negative electrode material layer, increasing the binding force of the electrode plate, and improving the battery performance.

In some embodiments, the solvent in step (i) may be any organic solvent applicable to such reactions. In some embodiments, the solvent in step (i) is selected from tetrahydrofuran, dimethylformamide, or dimethyl sulfoxide, and optionally tetrahydrofuran.

In some embodiments, the initiator in step (i) may be any initiator applicable to such reactions. In some embodiments, the initiator in step (i) is selected from azobisisobutyronitrile, dibenzoyl peroxide, and further optionally azobisisobutyronitrile.

In some embodiments, step (i) is performed under anaerobic conditions. In some embodiments, optionally, the step is performed in an inert gas atmosphere. In some embodiments, optionally, the step is performed in a nitrogen gas atmosphere. By adding an initiator and making it react under anaerobic conditions, free radicals generated in the reaction can be prevented from being oxidized, thereby suppressing the production of by-products.

In some embodiments, step (i) is performed at 60° C. to 80° C., and optionally 65° C. to 75° C., and further optionally at a temperature of 70° C. By controlling the temperature to fall within such a range, the polymerization speed can be controlled, and an appropriate molecular weight of the polymer is ensured.

In some embodiments, a reaction time in step (i) can be conventionally determined by a person skilled in the art. In some embodiments, the reaction in step (i) continues for 8 to 12 hours, and optionally 12 hours.

In some embodiments, in step (i), a ratio between a total mass of the compound of formula (I) and the compound of formula (II) to a mass of the chain transfer agent of formula (III) ranges from 10: 1 to 5000: 1, optionally 10: 1 to 100: 1, and further optionally 15: 1 to 80: 1. The inventor finds that, by setting the ratio between the total mass of various monomer compounds and the mass of the chain transfer agent to fall within an appropriate range, the molecular weight of the binder compound can be controlled to fall within an ideal range to ensure that the binder is highly adhesive and soluble and easy to process.

In some embodiments, in step (i), a molar ratio between the compound of formula (II) and the compound of formula (I) is 3: 1 to 0.005: 1, optionally 1.5: 1 to 0.005: 1, and further optionally 1: 1 to 0.01: 1. By controlling the molar ratio between the monomer compounds to fall within the foregoing range, the synthesized binder compound can be made flexible but not rigid, so that the electrode plate is not prone to break off after being wound, and that high adhesiveness is achieved to resist peel-off of the active material.

The preparation method according to this disclosure is a reversible addition-fragmentation chain transfer (RAFT) polymerization method. In a molecule resulting from this method includes a main-chain moiety formed by a monomer molecule and groups located at two ends of the main chain and brought by the initiator and the chain transfer agent. In this disclosure, a reactive group, such as a carboxyl group, exists at the end of the main chain of the binder compound resulting from the reaction, to facilitate subsequent modification of the graphite.

In some embodiments, the preparation method according to this disclosure uses the chain transfer agent of Formula (III). Optionally, the chain transfer agent is 4-cyano-4-(propylthiocarbonyl)sulfanylpentanoic acid (CPP) of Formula (III-1):

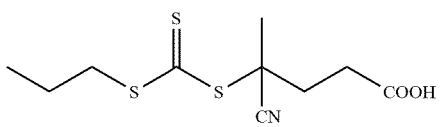

(III-1)

The inventor(s) finds that the chain transfer agent is highly capable of controlling the polymerization reaction, and, with synthesis conditions being controlled, can well control the range of the molecular weight of the polymerized binder compound.

In some embodiments, in Formula (I), $R^1$ to $R^6$ each are independently selected from hydrogen, halogen, substituent-free $C_1$ to $C_6$ alkyl, or substituent-free or substituent-containing $C_6$ to $C_{20}$ aryl. The substituent in the substituent-containing aryl is at least one selected from $C_1$ to $C_3$ alkyl or halogen.

In some embodiments, optionally, the compound of Formula (I) is selected from butadiene, isoprene, dimethylbutadiene, hexachlorobutadiene, chloroprene, ethylbutadiene, hexadiene, butadienebenzene, chloroprenebenzene, tetraphenylbutadiene, methylphenylbutadiene, or difluorophenylbutadiene.

By selecting the compound of Formula (I) with a flexible C—H framework, this disclosure imparts flexibility to the binder compound resulting from polymerization, and enables the binder compound to still maintain high binding performance during graphite expansion.

In some embodiments, in Formula (II), $R^7$ to $R^9$ each are independently selected from hydrogen, amino, substituent-free $C_1$ to $C_6$ alkyl, or substituent-free $C_1$ to $C_6$ alkylamino. Optionally, $R^7$ to $R^8$ each are independently selected from hydrogen, methyl, ethyl, dimethylamino, or 2-(N,N-diethylamino)ethyl, and $R^9$ is selected from hydrogen, methyl, or ethyl.

In some embodiments, the compound of Formula (II) is selected from styrene, β-methylstyrene, β-(dimethylamino)styrene, α-methylstyrene, α-ethylstyrene, β-ethylstyrene, or 2-(diethylamino)ethylstyrene.

Due to the benzene ring structure of the compound of Formula (II) selected above, π-π interactions between the benzene ring structure and graphite enables effective binding between the binder compound and the graphite.

In some embodiments, the preparation method according to the first aspect of this disclosure further includes the following steps:
(ii) leaving the reaction product obtained in step (i) to react with a reductant in a solvent to convert $R^{12}$ into a hydroxyl group; or
(iii) leaving the reaction product obtained in step (i) to react with an aminating agent in a solvent to convert $R^{12}$ into an amido group; and
(iv) leaving the reaction product obtained in step (iii) to react with an oxidant in a solvent under alkaline conditions to convert the amido group into an amino group.

Through the foregoing steps, a binder compound that ends with a hydroxyl group or an amino group can be further obtained from the product of step (i). The inventor finds that the binder compound containing such reactive groups can also modify the graphite, so as to alleviate the problem of floating of the binder.

In some embodiments, the solvent in step (ii) is at least one of tetrahydrofuran, dimethylformamide, or dimethyl sulfoxide.

In some embodiments, the reductant in step (ii) is $LiAlH_4$.

In some embodiments, step (ii) is performed at −5° C. to 5° C., and optionally at a temperature of 0° C.

In some embodiments, the solvent in step (iii) is at least one of methanol or ethanol.

In some embodiments, the aminating agent in step (iii) is ammonia.

In some embodiments, step (ii) is performed at 35° C. to 55° C., and optionally at a temperature of 45° C. to 50° C.

In some embodiments, the solvent in step (iv) is at least one of methanol or ethanol.

In some embodiments, the oxidant in step (iv) is sodium hypochlorite.

In some embodiments, step (iv) is performed in the presence of sodium hydroxide. In some embodiments, step (iv) occurs at 20° C. to 30° C., and optionally at a temperature of 25° C. to 30° C.

In some embodiments, a reaction time in steps (ii) to (iv) can be conventionally determined by a person skilled in the art.

In some embodiments, the reaction in step (ii) continues for 4 to 6 hours, and optionally 4 hours.

In some embodiments, the reaction in step (iii) continues for 10 to 14 hours, and optionally 10 hours.

In some embodiments, the reaction in step (iv) continues for 6 to 8 hours, and optionally 6 hours.

Binder Compound

This disclosure further provides a binder compound, and the binder compound is formulated by the foregoing method for preparing a binder compound. The binder compound according to this disclosure can be covalently bound to the surface of the graphite. Therefore, the binder compound can be evenly distributed in the graphite in a conventional coating and drying process, thereby fundamentally solving the problem of battery performance deterioration caused by the floating of the negative binder during the coating and drying of the negative electrode material.

In some embodiments, the binder compound possesses a structure expressed as Formula (IV):

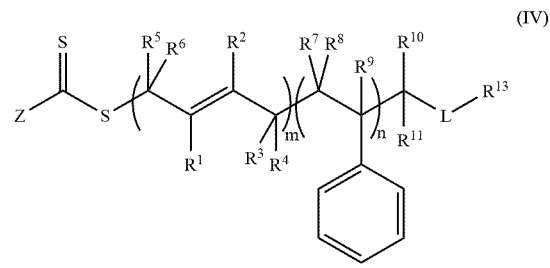

(IV)

In the formula above:
Meanings of $R^1$ to $R^{11}$, Z, and L are the same as those defined herein above;
$R^{13}$ represents carboxyl, hydroxymethyl, or amino; and
a ratio of m to n is 1 to 100, optionally 1 to 50, and further optionally 1 to 13.

In this disclosure, the binder contains a special functional group. When the relative content of the functional group is controlled to fall within the foregoing range, a compound bond can be formed between a polymer chain and the surface of the graphite particles. In addition, the binder moiety is highly flexible. The negative electrode plate made of the graphite so modified is also flexible and not prone to crack.

In some embodiments, in Formula (IV), m is an integer ranging from 500 to 15,000, and n is an integer ranging from 500 to 15,000.

In some embodiments, the number-average molecular weight of the compound of Formula (IV) is 30,000 to 3,000,000, optionally 50,000 to 2,000,000, and further optionally 300,000 to 1,000,000.

In some embodiments, the structural units

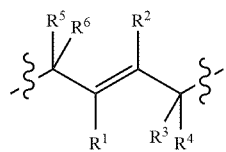

and

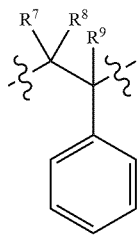

are copolymerized in a random, blocked, and/or alternating manner, and optionally, in a blocked manner.

The inventor finds that, by controlling the number-average molecular weight of the binder compound of Formula (IV) to fall within the foregoing range, it is ensured that a relatively large number of groups of the binder compound are operative, and that the binder is highly adhesive and soluble and easy to process.

In some embodiments, the binder compound is selected from:

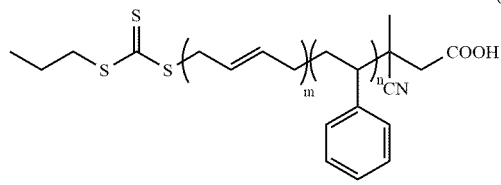
(IV-1)

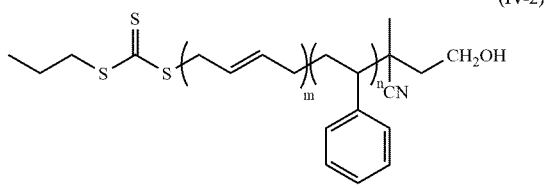
(IV-2)

or

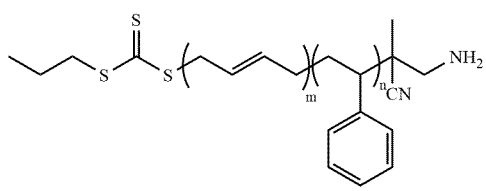
(IV-3)

The foregoing binder compound can achieve a good binding effect and chemically bond with the graphite to desirable effect, thereby further improving battery performance. The inventor finds that the foregoing binder compounds can be used to modify graphite, and chemically react with inherent groups (such as carboxyl groups) on the surface of graphite to form chemical bonds, thereby firm links between the binder and graphite. In the subsequent process of coating the electrode plate, the floating phenomenon of conventional binders is avoided, thereby fundamentally improving the binding performance of the electrode plate, avoiding peel-off of the active material on the electrode plate within the life cycle of the battery cell, and in turn, improving the cycle performance of the battery cell.

Negative Electrode Plate

A third aspect of this disclosure provides a negative electrode plate. The negative electrode plate includes a negative current collector and a negative material layer disposed on at least one surface of the negative current collector. The negative material layer includes the modified graphite according to the first aspect of this disclosure or the modified graphite formulated by the preparation method according to the second aspect of this disclosure.

For example, the negative current collector includes two surfaces opposite to each other in a thickness direction thereof. The negative material layer is disposed on either or both of the two opposite surfaces of the negative current collector.

In some embodiments, the negative current collector may be a metal foil or a composite current collector. For example, the metal foil may be a copper foil. The composite current collector may include a polymer material base layer and a metal layer formed on at least one surface of the polymer material base layer. The composite current collector may be formed by overlaying a polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative material layer further optionally includes a conductive agent. The conductive agent may be at least one selected from superconductive carbon, acetylene black, carbon black, Ketjen black, carbon dots, carbon nanotubes, graphene, or carbon nanofibers.

In some embodiments, the negative material layer further optionally includes other agents, such as a thickener (for example, sodium carboxymethyl cellulose (CMC—Na)).

In some embodiments, the negative electrode plate may be prepared according to the following method: dispersing the ingredients of the negative electrode plate such as the negative active material, the conductive agent, and the binder and any other ingredients in a solvent (such as deionized water) to form a negative slurry, coating a negative current collector with the negative slurry, and performing steps such as drying and cold pressing to obtain the negative electrode plate.

The inventor finds that the negative electrode plate formulated by using the modified graphite according to this disclosure can be dried just under conventional drying conditions, without a need to perform multi-stage drying, low-temperature drying and the like that lead to relatively low production efficiency. In other words, the modified graphite according to this disclosure can alleviate the problem of binder floating without affecting the production efficiency, so as to obtain an electrode plate or battery of higher performance.

Secondary Battery

A fourth aspect of this disclosure provides a secondary battery. The secondary battery includes the negative electrode plate according to the third aspect of this disclosure.

Generally, the secondary battery includes a positive electrode plate, a negative electrode plate, an electrolyte, and a separator. In a charge-and-discharge cycle of the battery, active ions are shuttled between the positive electrode plate and the negative electrode plate by intercalation and deintercalation. The electrolyte serves to conduct ions between the positive electrode plate and the negative electrode plate. Located between the positive electrode plate and the negative electrode plate, the separator mainly serves to prevent a short circuit between the positive electrode plate and the negative electrode plate, and is penetrable to ions.

In some embodiments, the secondary battery is a lithium-ion secondary battery.

Positive Electrode Plate

The positive electrode plate includes a positive current collector and a positive material layer that overlays at least one surface of the positive current collector. The positive material layer includes a positive active material according to the first aspect of this disclosure.

As an example, the positive current collector includes two surfaces opposite to each other in a thickness direction thereof. The positive material layer is disposed on either or both of the two opposite surfaces of the positive current collector.

In some embodiments, the positive current collector may be a metal foil or a composite current collector. For example, the metal foil may be an aluminum foil. The composite current collector may include a polymer material base layer and a metal layer formed on at least one surface of the polymer material base layer. The composite current collector may be formed by overlaying a polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a positive active material that is well known in the art for use in a battery. Exemplarily, the positive active material may include at least one of the following materials: olivine-structured lithium-containing phosphate, lithium transition metal oxide, and a modified compound thereof. However, this disclosure is not limited to such materials, and other conventional materials usable as a positive active material of a battery may be used instead. One of the positive active materials may be used alone, or at least two thereof may be combined and used together. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as $NCM_{333}$), $LiNi_{0.5}Co_{0.2}Mn_{0.3}O_2$ (briefly referred to as $NCM_{523}$), $LiNi_{0.5}Co_{0.25}Mn_{0.25}O_2$ (briefly referred to as $NCM_{211}$), $LiNi_{0.6}Co_{0.2}Mn_{0.2}O_2$ (briefly referred to as $NCM_{622}$), $LiNi_{0.8}Co_{0.1}Mn_{0.1}O_2$ (briefly referred to as $NCM_{811}$)), lithium nickel cobalt aluminum oxide (such as $LiNi_{0.85}Co_{0.15}Al_{0.05}O_2$), or a modified compound thereof.

Examples of the olivine-structured lithium-containing phosphate may include, but are not limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive material layer further optionally includes a binder. For example, the binder may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly(tetrafluoroethylene-co-hexafluoropropylene), or fluorinated acrylate resin.

In some embodiments, the positive material layer further optionally includes a conductive agent. For example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, and the binder and any other ingredients in a solvent (such as N-methyl-pyrrolidone (NMP)) to form a positive slurry, coating a positive current collector with the positive slurry, and performing steps such as drying and cold pressing to obtain the positive electrode plate.

Electrolyte

The electrolyte serves to conduct ions between the positive electrode plate and the negative electrode plate. The type of the electrolyte is not specifically limited in this disclosure, and may be selected as required. For example, the electrolyte may be in liquid- or gel-state, or all solid-state.

In some embodiments, the electrolyte is an electrolytic solution. The electrolytic solution includes an electrolyte salt and a solvent.

The electrolyte salt may be an electrolyte salt that is well known in the art for use in a secondary battery. In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato)phosphate, or lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl)ethane.

In some embodiments, the electrolytic solution further optionally includes an additive. For example, the additive may include a negative film-forming additive or a positive film-forming additive. The additive may further include additives capable of improving specified performance of the battery, for example, an additive for improving overcharge performance of the battery, an additive for improving high-or low-temperature performance of the battery, and the like.

Separator

In some embodiments, the secondary battery further includes a separator. The type of the separator is not particularly limited in this disclosure, and may be any well-known porous separator that is highly stable both chemically and mechanically.

In some embodiments, the material of the separator may be at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be wound or stacked to form an electrode assembly.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The material of the soft package may be plastic such as polypropylene, polybutylene terephthalate, or polybutylene succinate.

Figure 6:
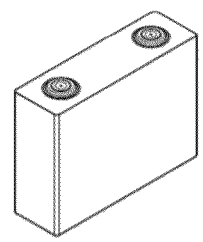
FIG. 6 is a schematic diagram of a secondary battery according to an embodiment of this disclosure.

The shape of the secondary battery is not particularly limited in this disclosure, and may be cylindrical, prismatic or any other shape. FIG. 6 shows a prismatic secondary battery 5 as an example.

Figure 7:
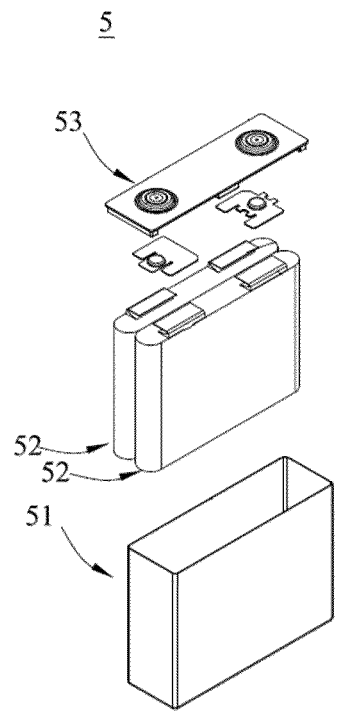
FIG. 7 is an exploded view of a secondary battery according to an embodiment of this disclosure.

In some embodiments, referring to FIG. 7, the outer package may include a housing body 51 and a cover plate 53. The housing body 51 may include a bottom plate and a side plate connected to the bottom plate. The bottom plate and the side plate close in to form an accommodation cavity. The housing body 51 is provided with an opening that communicates with the accommodation cavity. The cover plate 53 can cover the opening to close the accommodation cavity. The positive electrode plate, the negative electrode plate, and the separator may be wound or stacked to form the electrode assembly 52. The electrode assembly 52 is packaged in the accommodation cavity. The electrolytic solution serves a function of infiltration in the electrode assembly 52. The number of electrode assemblies 52 in a secondary battery 5 may be one or more, and may be selected by a person skilled in the art as actually required.

In some embodiments, the secondary battery may be assembled into a battery module. The battery module may include one or more secondary batteries, and the specific number of secondary batteries in a battery module may be selected by a person skilled in the art depending on the disclosure scenario and capacity of the battery module.

Figure 8:
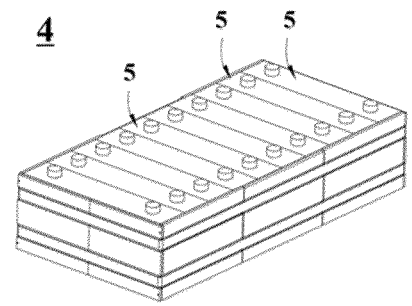
FIG. 8 is a schematic diagram of a battery module according to an embodiment of this disclosure.

FIG. 8 shows a battery module 4 as an example. Referring to FIG. 8, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery modules may be assembled into a battery pack. The battery pack may include one or more battery modules, and the specific number of battery modules in a battery pack may be selected by a person skilled in the art depending on practical disclosures and capacity of the battery pack.

Figure 9:
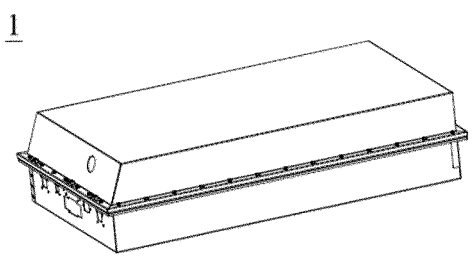
FIG. 9 is a schematic diagram of a battery pack according to an embodiment of this disclosure.
Figure 10:
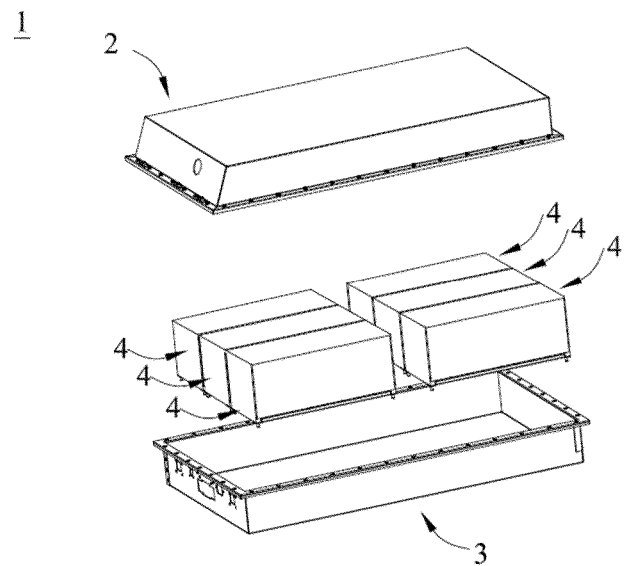
FIG. 10 is an exploded view of a battery pack according to an embodiment of this disclosure.

FIG. 9 and FIG. 10 show a battery pack 1 as an example. Referring to FIG. 9 and FIG. 10, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this disclosure provides an electrical device. The electrical device includes at least one of the secondary battery, the battery module, or the battery pack according to this disclosure. The secondary battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for the electrical device according to practical requirements of the electrical device.

Figure 11:
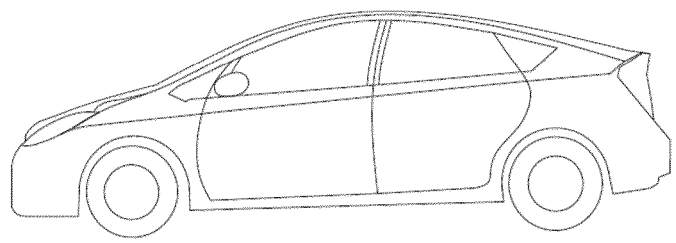
FIG. 11 is a schematic diagram of an electrical device that uses a secondary battery as a power supply according to an embodiment of this disclosure.

FIG. 11 shows an electrical device as an example. The electrical device may be a battery electric vehicle, a hybrid electric vehicle, a plug-in hybrid electric vehicle, or the like. To meet the requirements of the electrical device on a high power and a high energy density of the secondary battery, a battery pack or a battery module may be employed.

In another example, the device may be a mobile phone, a tablet computer, a notebook computer, or the like. The apparatus is generally required to be thin and light, and may have a secondary battery as a power supply.

Embodiments

The following describes embodiments of this disclosure. The embodiments described below are exemplary, and are merely intended to construe this disclosure but not to limit this disclosure. In a case that no specific technique or condition is specified in an embodiment, the techniques or conditions described in the literature in this field or described in the instruction manual of the product may apply. A reagent or instrument used herein without specifying the manufacturer is a conventional product that is commercially available in the market.

Test Methods

Infrared Spectroscopy Test

Measuring structural composition of the binders in all the embodiments and comparative embodiments based on the standard GB/T6040-2002 General Rules for Infrared Spectroscopy by using IS 10 Fourier Transform Infrared Spectroscope manufactured by US-based Nicolet Instrument Corporation. A wavenumber range under test is 400 to 4000 cm$^{-1}$.

Number-Average Molecular Weight (Mn) Test

Measuring the number-average molecular weight (Mn) of the binder compounds obtained in all embodiments, where the measurement instrument is HLC-8320GPC gel permeation chromatography (SuperMultiporeHZ series semi-micro SEC column, using polystyrene as a type specimen) manufactured by Japan-based Tosoh Corporation.

Test process: Dissolving 2 mg of polymer powder specimen in a DMF solvent that is 2 mL in volume and specially applicable to GPC, and then feeding the specimen in an amount of 2.5 µL for testing.

Parameters:
Pump flow rate: 5 mL/min;
Filling volume: 100 µL;
Temperature limit: 60° C.;
Data collection frequency: 100 Hz.

Nuclear magnetic resonance spectroscopy of hydrogen

Measuring a molecular structure of the product on a Bruker AVANCE III 400 nuclear magnetic resonance (NMR) instrument at a test temperature of 25° C., where an internal standard is tetramethylsilane (TMS) and the solvents are deuterated chloroform ($CDCl_3$), deuterated methanol ($CD_3OD$-$d_4$), and deuterated dimethyl sulfoxide (DMSO-$d_6$).

Test process: Dissolving 5 mg of specimen in the foregoing solvents, transferring the solution to an NMR tube, and feeding the specimen in an amount of 1 mL for testing.

In this way, the molecular structure of the product can be determined, and the values of m and n can be determined.

Binding Performance Test

Cutting out 100 mm (length) × 10 mm (width) specimens from the negative electrode plates prepared in the embodiments and comparative embodiments. Taking a stainless steel sheet 25 mm wide, sticking double-sided tape (11 mm wide) to the steel sheet, pasting a negative material side of the specimen onto the double-sided tape on the stainless steel sheet, and using a 2000 g pressure roller to roll on the surface of the specimen back and forth for three times at a speed of 300 mm/min.

Subsequently, bending one end of the specimen by 180 degrees, manually peeling off the negative material layer from the current collector of the specimen by 25 mm apart along the length direction, fixing the specimen on an INSTRON 336 testing machine, keeping the peeling surface consistent with the force line of the testing machine (that is, parallel to a direction in which the testing machine moves during peeling), and keeping peeling off the specimen continuously with the testing machine at a speed of 30 mm/min to obtain a peel force curve. Taking an average value of a steady segment (that is, a segment that stops increasing monotonically on the peel force curve) in a range of approximately 30 s as the peel force F0, and calculating the binding force between the negative film and the current collector in the specimen according to: binding force $F = F0/$ specimen width (unit of F: N/m).

Dispersion Performance Test

Measuring the dispersion performance of the binder by performing an electron probe X-ray microscopy test on a longitudinal section (that is, the thickness direction) of the electrode plate under test, where the test standard is GB/T32055-2015, the instrument is Japan-based Shimadzu EPMA-1720, the emission source is X-ray from a W filament, and the take-off angle is 52.5° C.; and then observing the dispersion (or floating) of the binder in the negative electrode plate material under test.

Testing the Cycle Performance of the Battery

Charging a lithium-ion battery under test at a constant current of 1 C rate at 25° C. until a charge cut-off voltage 4.30 V, then charging the battery at a constant voltage until the current is less than or equal to 0.05 C, and leaving the battery to stand for 10 minutes; discharging the battery at a constant current of 1 C rate until a discharge cut-off voltage 3.3 V, and leaving the battery to stand for 10 minutes, thereby completing a charge-and-discharge cycle (that is, one cycle). Performing 1000 charge-and-discharge cycles for the battery according to the foregoing method, and determining a discharge capacity retention rate by comparing the discharge capacity at the end of the $1000^{th}$ charge-and-discharge cycle to the discharge capacity at the end of the $1^{st}$ charge-and-discharge cycle.

Testing High-Temperature Storage Performance of the Battery

A capacity of a fresh lithium-ion battery is an initial capacity, that is, before-storage capacity C0. A method for testing the initial capacity is: Placing a before-storage battery in a 25° C. environment. Charging the battery at a constant current of 1 C rate until a charge cut-off voltage 4.35 V, then charging the battery at a constant voltage until the current is less than or equal to 0.05 C, and then discharging the battery at a constant current of 1 C rate until a discharge cut-off voltage 2.8 V, and measuring an initial capacity C0 of the lithium-ion battery.

Charging the lithium-ion battery under test at a constant current of 1 C rate at 25° C. until a charge cut-off voltage 4.35 V, then charging the battery at a constant voltage until the current is less than or equal to 0.05 C, and then transferring the battery and storing it in 60° C. environment. Placing the battery back to a 25° C. environment upon completion of 180 days (d) of storage. Charging the battery at a constant current of 1 C rate until a charge cut-off voltage 4.35 V, then charging the battery at a constant voltage until the current is less than or equal to 0.05 C, and then discharging the battery at a constant current of 1 C rate until a discharge cut-off voltage 2.8 V, and measuring a discharge capacity C1. Capacity retention rate of the battery cell at the end of 180 days of storage = C1/C0 × 100%.

Embodiment 1

1. Preparing a binder compound containing a terminal carboxyl group

Adding and dissolving 10.4 g (0.100 mol) of styrene, 5.4 g (0.100 mol) of butadiene, and 0.5 g of chain transfer agent 4-cyano-4-(propyl thiocarbonyl) sulfanylpentanoic acid (CPP) in a three-necked flask containing 200 mL of tetrahydrofuran; and vacuumizing to prevent the free radical from being oxidized. Adding, upon completion of vacuumizing, 0.05 g of azobisisobutyronitrile initiator into the foregoing three-necked flask on condition that $N_2$ is continuously passed into the flask, and heating up to 70° C. Stirring and reacting at 70° C. for 12 hours to obtain a crude product. Pouring the crude product into 0° C. glacial ether to settle, so that a binder compound is obtained.

The synthetic route is shown in the drawing below:

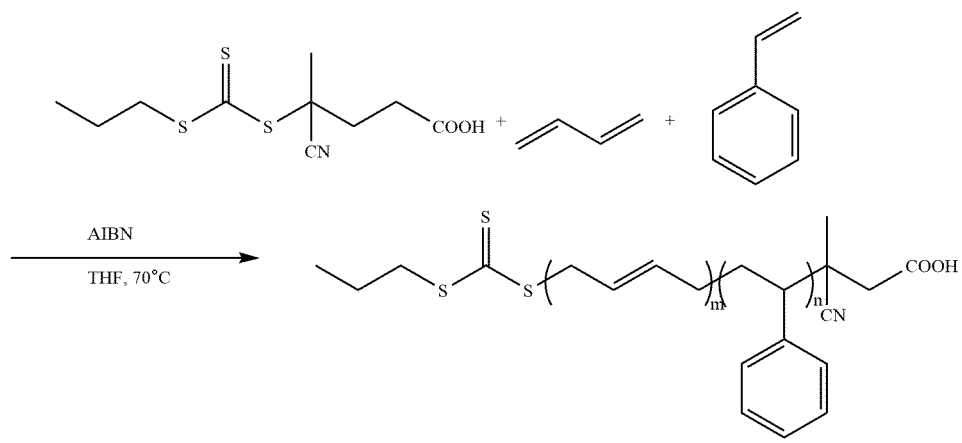

Performing an infrared spectroscopy test on the binder compound. The test results are shown in FIG. 1. In the drawing, the wavenumber range 2800 to 3000 cm$^{-1}$ represents stretching vibrations of saturated C—H or CH$_2$. A band within 3000 to 3100 cm$^{-1}$ is a characteristic peak of C—H on a benzene ring. 1493 cm$^{-1}$ and 1601 cm$^{-1}$ represent framework vibrations of the benzene ring. 698 cm$^{-1}$ and 757 cm$^{-1}$ represent out-of-plane bending vibrations of hydrogen on a monosubstituted benzene ring, 909 cm$^{-1}$ is a characteristic absorption peak of out-of-plane bending vibrations of C—H on a C=C—H double bond of 1,2-butadiene. The strong absorption peak at 965 cm$^{-1}$ is a characteristic absorption peak of out-of-plane bending vibrations of C—H on the C=C—H double bond of 1,4-butadiene.

2. Preparing Modified Graphite

Weighing out an amount of graphite and an amount of the binder compound prepared in step 1 at a mass ratio of 95: 2, placing them into a reaction vessel, and then adding pyridine and dichloromethane into the vessel. Stirring and reacting at 25° C. with a pH value of 4.5 to 6 for 2 hours, and then filtering to obtain a solid substance. Transferring the obtained solid substance into a beaker, adding an appropriate amount of dichloromethane, rinsing by stirring for 30 minutes, and then filtering and drying to obtain modified graphite.

Figure 2:
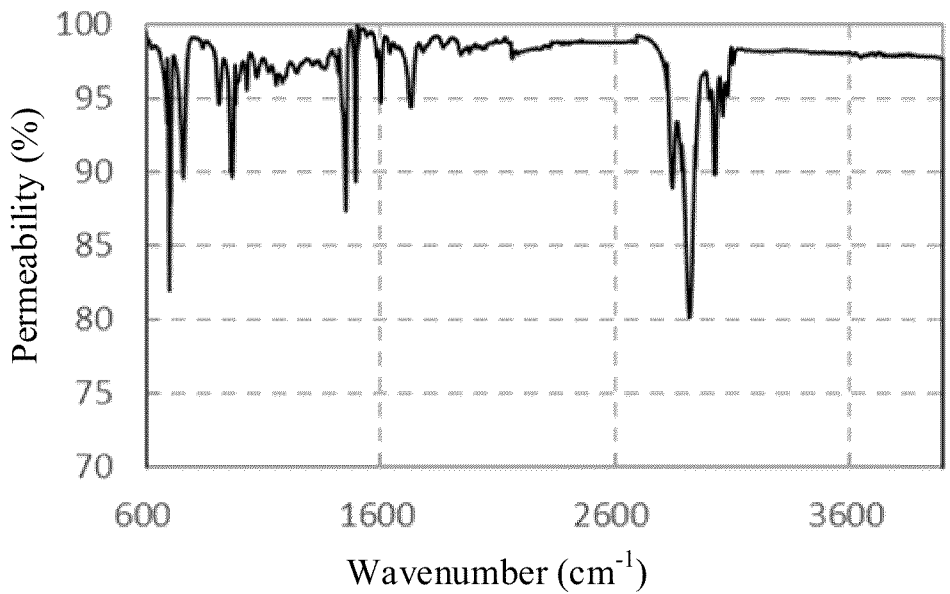
FIG. 2 shows an infrared spectrum of modified graphite prepared according to Embodiment 1.

Dispersing the modified graphite in NMP, and then filtering, rinsing, and drying to obtain a solid substance. Performing an infrared spectroscopy test on the solid substance. The test results are shown in FIG. 2. In the drawing, the wavenumber range 2800 to 3000 cm$^{-1}$ represents stretching vibrations of saturated C—H or CH$_2$. A band within 3000 to 3100 cm$^{-1}$ is a characteristic peak of C—H on a benzene ring. 1493 cm$^{-1}$ and 1601 cm$^{-1}$ represent framework vibrations of the benzene ring. 698 cm$^{-1}$ and 757 cm$^{-1}$ represent out-of-plane bending vibrations of hydrogen on a monosubstituted benzene ring, 909 cm$^{-1}$ is a characteristic absorption peak of out-of-plane bending vibrations of C—H on a C=C—H double bond of 1,2-butadiene. The strong absorption peak at 965 cm$^{-1}$ is a characteristic absorption peak of out-of-plane bending vibrations of C—H on the C=C—H double bond of 1,4-butadiene.

The binder compound according to this disclosure is a high molecular polymer, and is soluble in NMP. However, the modified graphite obtained by binding the binder compound according to this disclosure with graphite is insoluble in NMP. Therefore, after the foregoing treatment, the characteristic peak of the binder compound still exists in the infrared spectrum of the modified graphite. This shows that, in the modified graphite obtained in this step, the binder compound and the graphite are bound by chemical bonding rather than physical blending.

3. Preparing a Negative Electrode Plate

Dry-mixing the modified graphite prepared in step 2 with carbon black as a conductive agent at a weight ratio of 97: 3, adding deionized water, adjusting the solid content to 45 wt% to 55 wt%, and stirring well to obtain a negative slurry. Subsequently, coating a current collector copper foil with the slurry in an amount of 150 mg/cm², and then performing drying, cold pressing, and slitting to make a negative electrode plate. The coating and drying conditions are: coating speed 50 m/min; and, drying temperature 130° C.

4. Preparing a Positive Electrode Plate

Mixing well a positive ternary material (lithium nickel cobalt manganese oxide), carbon black as a conductive agent, and polyvinylidene difluoride (PVDF) as a binder at a weight ratio of 96: 2.5: 1.5, and then adding a solvent NMP. Adjusting the solid content to 70 wt% to 80 wt%, stirring well to obtain a positive slurry. Subsequently, coating the current collector with the slurry in an amount of 200 mg/cm², and then performing drying, cold pressing, and slitting to make a positive electrode plate.

5. Preparing a Lithium-Ion Battery

Winding the electrode plates prepared in steps 3 and 4 and a separator into a battery cell, packaging the battery cell in an aluminum plastic film to form a dry cell. Performing steps such as electrolyte injection, chemical formation, and aging to make a lithium-ion battery. An electrolytic solution used in the electrolyte injection step is prepared in the following way: first, mixing ethylene carbonate (EC) and ethyl methyl carbonate (EMC) well at a volume ratio of 3: 7, and then adding LiPF$_6$ to formulate a solution with a concentration of 1 mol/L.

Embodiment 2

1. Preparing a binder compound containing a terminal hydroxyl group (1) Adding and dissolving 10.4 g (0.100 mol) of styrene, 5.4 g (0.100 mol) of butadiene, and 0.5 g of chain transfer agent CPP in a three-necked flask containing 200 mL of tetrahydrofuran; and vacuumizing to prevent the free radical from being oxidized. Adding, upon completion of vacuumizing, 0.05 g of azobisisobutyronitrile initiator into the foregoing three-necked flask on condition that N$_2$ is continuously passed into the flask, and heating up to 70° C.

Stirring and reacting at 70° C. for 12 hours to obtain a crude product. Pouring the crude product into 0° C. glacial ether to settle, so that a powdery solid is obtained.

(2) Dissolving the obtained powdery solid in 200 mL of tetrahydrofuran, adding 0.5 g of LiAlH$_4$, stirring and reacting the solution in an ice-water bath at 0° C. for 4 hours, and then pouring the reaction solution into 0° C. glacial ether to settle again, so that a binder product is obtained. The synthetic route in this step is shown below:

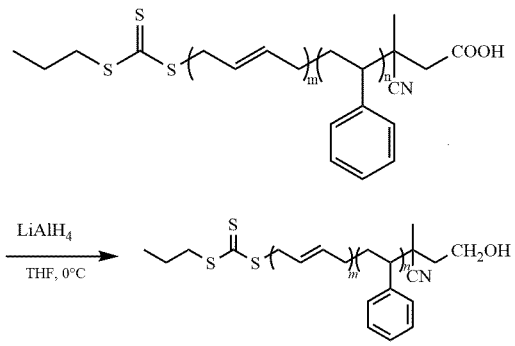

2. Preparing modified graphite

Weighing out an amount of graphite and an amount of the binder compound prepared in step 1 at a mass ratio of 95: 2, placing them into a reaction vessel, and then adding pyridine and dichloromethane into the vessel. Stirring and reacting at 25° C. with a pH value of 4.5 to 6 for 2 hours, and then filtering to obtain a solid substance. Transferring the obtained solid substance into a beaker, adding an appropriate amount of dichloromethane, rinsing by stirring for 30 minutes, and then filtering and drying to obtain modified graphite.

Figure 3:
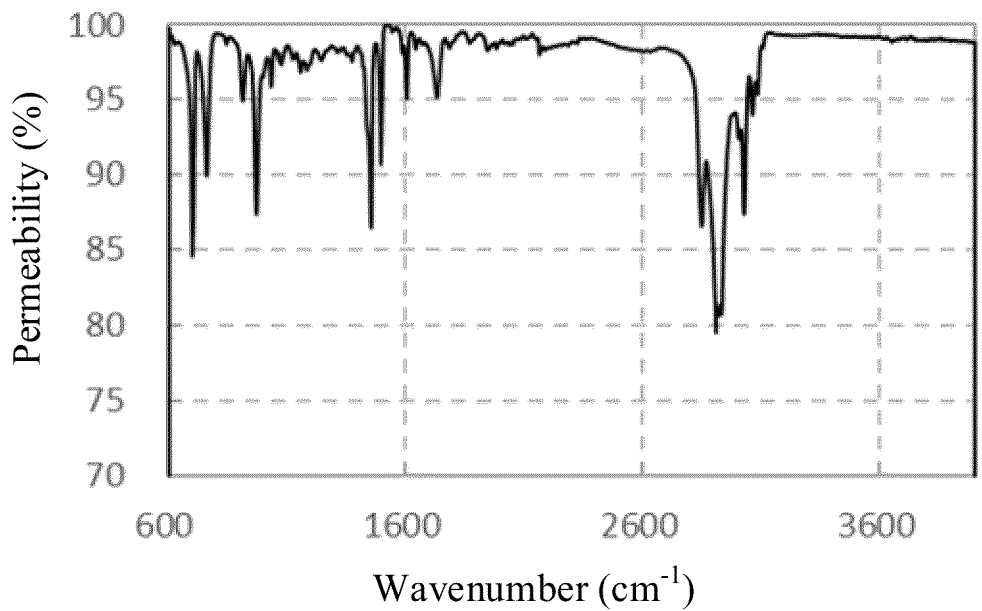
FIG. 3 shows an infrared spectrum of modified graphite prepared according to Embodiment 2.

Dispersing the modified graphite in NMP, and then filtering, rinsing, and drying to obtain a solid substance. Performing an infrared spectroscopy test on the solid substance. The test results are shown in FIG. 3. In the drawing, the wavenumber range 2800 to 3000 cm$^{-1}$ represents stretching vibrations of saturated C—H or CH$_2$. A band within 3000 to 3100 cm$^{-1}$ is a characteristic peak of C—H on a benzene ring. 1493 cm$^{-1}$ and 1601 cm$^{-1}$ represent framework vibrations of the benzene ring. 698 cm$^{-1}$ and 757 cm$^{-1}$ represent out-of-plane bending vibrations of hydrogen on a monosubstituted benzene ring, 909 cm$^{-1}$ is a characteristic absorption peak of out-of-plane bending vibrations of C—H on a C=C—H double bond of 1,2-butadiene. The strong absorption peak at 965 cm$^{-1}$ is a characteristic absorption peak of out-of-plane bending vibrations of C—H on the C=C—H double bond of 1,4-butadiene. Evidently, as shown in an infrared spectroscopy test, the modified graphite still achieves spectral results similar to the foregoing binder compound after being subjected to solvent treatment. This shows that, in the modified graphite, the binder moiety and the graphite are bound by chemical bonding rather than physical blending.

3. Preparing a negative electrode plate, a positive electrode plate, and a lithium-ion battery separately according to steps 3 to 5 in Embodiment 1.

Embodiment 3

1. Preparing a Binder Compound Containing a Terminal Amino Group (1) Adding and dissolving 10.4 g (0.100 mol) of styrene, 5.4 g (0.100 mol) of butadiene, and 0.5 g of chain transfer agent CPP in a three-necked flask containing 200 mL of tetrahydrofuran; and vacuumizing to prevent the free radical from being oxidized. Adding, upon completion of vacuumizing, 0.05 g of azobisisobutyronitrile initiator into the foregoing three-necked flask on condition that N$_2$ is continuously passed into the flask, and heating up to 70° C. Stirring and reacting at 70° C. for 12 hours to obtain a crude product. Pouring the crude product into 0° C. glacial ether to settle, so that a powdery solid is obtained.

(2) Transferring the obtained powdery solid into a three-necked flask, adding 200 mL of methanol, passing ammonia gas into the flask at a reaction temperature of 45° C., keeping reacting for 10 hours, and then pouring the reaction product into 0° C. glacial ether to settle, so that a solid is obtained. Transferring the obtained solid into a round-bottomed flask, adding 2 g of sodium hypochlorite, dissolving in 200 mL of methanol, and then adding 50 mL of sodium hydroxide, and stirring and reacting at 25° C. for 6 hours. Finally, pouring the resulting product into 0° C. glacial ether to settle, so that a desired binder product is obtained. The reaction route in this step is shown below:

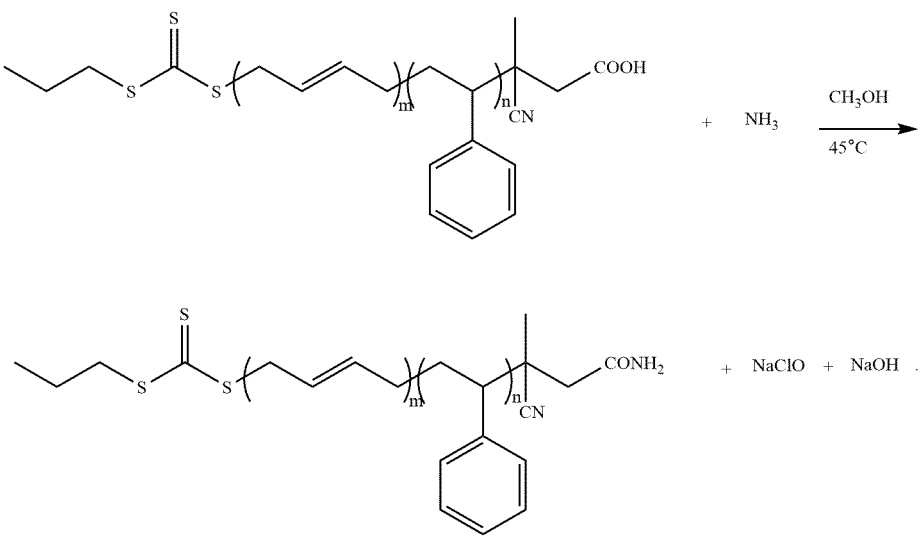

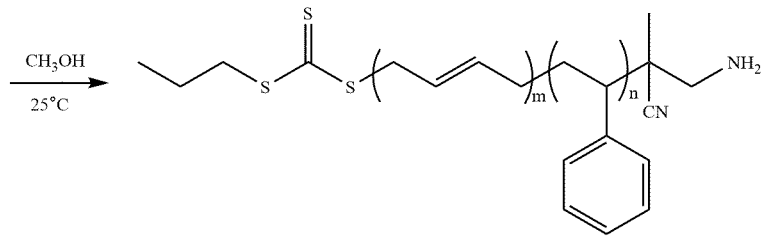

2. Preparing modified graphite

Weighing out an amount of graphite and an amount of the binder compound prepared in step 1 at a mass ratio of 95: 2, placing them into a reaction vessel, and then adding pyridine and dichloromethane into the vessel. Stirring and reacting at 25° C. with a pH value of 4.5 to 6 for 2 hours, and then filtering to obtain a solid substance. Transferring the obtained solid substance into a beaker, adding an appropriate amount of dichloromethane, rinsing by stirring for 30 minutes, and then filtering and drying to obtain modified graphite.

Figure 4:
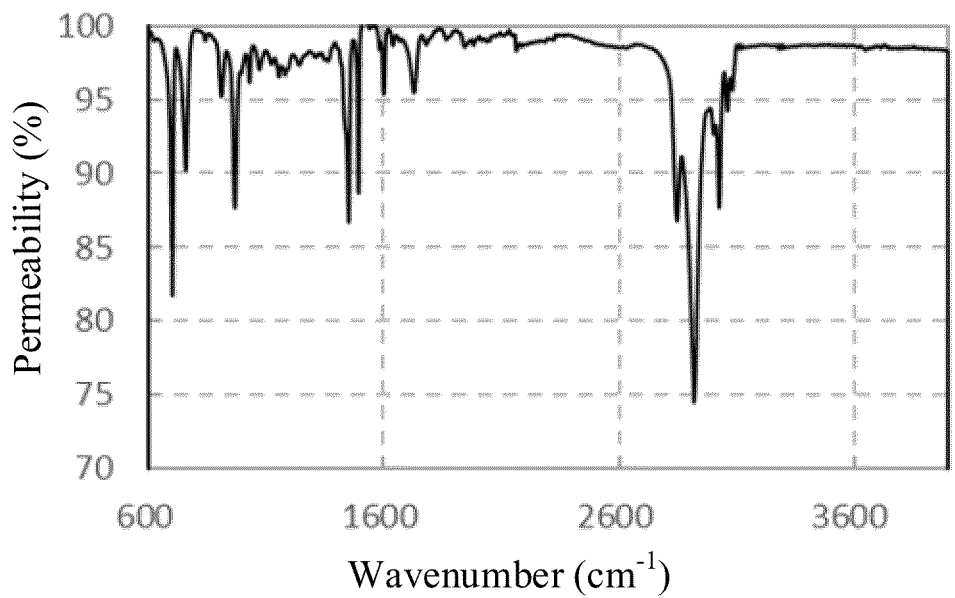
FIG. 4 shows an infrared spectrum of modified graphite prepared according to Embodiment 3.

Dispersing the modified graphite in NMP, and then filtering, rinsing, and drying to obtain a solid substance. Performing an infrared spectroscopy test on the solid substance. The test results are shown in FIG. 4. In the drawing, the wavenumber range 2800 to 3000 cm$^{-1}$ represents stretching vibrations of saturated C—H or $CH_2$. A band within 3000 to 3100 cm$^{-1}$ is a characteristic peak of C—H on a benzene ring. 1493 cm$^{-1}$ and 1601 cm$^{-1}$ represent framework vibrations of the benzene ring. 698 cm$^{-1}$ and 757 cm$^{-1}$ represent out-of-plane bending vibrations of hydrogen on a monosubstituted benzene ring, 909 cm$^{-1}$ is a characteristic absorption peak of out-of-plane bending vibrations of C—H on a C=C—H double bond of 1,2-butadiene. The strong absorption peak at 965 cm$^{-1}$ is a characteristic absorption peak of out-of-plane bending vibrations of C—H on the C=C—H double bond of 1,4-butadiene. Evidently, as shown in an infrared spectroscopy test, the modified graphite still achieves spectral results similar to the foregoing binder compound after being subjected to solvent treatment. This shows that, in the modified graphite, the binder moiety and the graphite are bound by chemical bonding rather than physical blending.

3. Preparing a negative electrode plate, a positive electrode plate, and a lithium-ion battery separately according to steps 3 to 5 in Embodiment 1.

Embodiment 4

1. Preparing a Binder Compound

Adding and dissolving 3.9 g (0.033 mol) of β-methylstyrene, 6.8 g (0.100 mol) of isoprene, and 0.5 g of chain transfer agent CPP in a three-necked flask containing 200 mL of tetrahydrofuran; and vacuumizing to prevent the free radical from being oxidized. Adding, upon completion of vacuumizing, 0.05 g of azobisisobutyronitrile initiator into the foregoing three-necked flask on condition that $N_2$ is continuously passed into the flask, and heating up to 70° C. Stirring and reacting at 70° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 5

1. Preparing a Binder Compound

Adding and dissolving 3.5 g (0.034 mol) of styrene, 26.1 g (0.100 mol) of hexachlorobutadiene, and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a product. Pouring the product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 6

1. Preparing a Binder Compound

Adding and dissolving 0.6 g (0.005 mol) of α-methylstyrene, 8.9 g (0.101 mol) of chloroprene, and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a product. Pouring the product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 7

1. Preparing a Binder Compound

Adding and dissolving 1.3 g (0.010 mol) of α-ethylstyrene, 8.9 g (0.101 mol) of chloroprene, and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a crude product. Pouring the crude product into 0° C. glacial ether to settle, so that binder powder is obtained.

2. Preparing modified graphite, a negative electrode plate, a positive electrode plate, and a lithium-ion battery separately according to steps 2 to 5 in Embodiment 1.

Embodiment 8

1. Preparing a Binder Compound

Adding and dissolving 1.2 g (0.012 mol) of styrene, 8.2 g (0.100 mol) of ethylbutadiene, and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 7° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 9

1. Preparing a Binder Compound

Adding and dissolving 0.2 g (0.002 mol) of styrene, 8.2 g (0.100 mol) of 1,3-hexadiene, and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 10

1. Preparing a Binder Compound

Adding and dissolving 0.4 g (0.004 mol) of styrene, 13.1 g (0.101 mol) of phenyl-1,3-butadiene (CAS: 16939-57-4, by Jiangsu Aikon Biopharmaceutical R&D Co., Ltd.), and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 11

1. Preparing a Binder Compound

Adding and dissolving 0.3 g (0.003 mol) of styrene, 16.5 g (0.100 mol) 4-chloro-1,3-butadiene-benzene (CAS No: 18684-87-2, by Shenzhen Atomax Chemicals Co., Ltd.), and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 12

1. Preparing a Binder Compound

Adding and dissolving 0.9 g (0.007 mol) of β-ethylstyrene, 23.4 g (0.100 mol) of 1,1-bis-(4-methylphenyl)-1,3-butadiene (CAS: 93874-11-4, by Shenzhen Atomax Chemicals Co., Ltd.), and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiment 13

1. Preparing a Binder Compound

Adding and dissolving 1.6 g (0.005 mol) of 2-(diethylamino)ethylstyrene (CAS: 74952-73-1, by Shenzhen Atomax Chemicals Co., Ltd.), 24.2 g (0.100 mol) difluorophenylbutadiene (CAS: 3888-61-7), and 0.5 g of chain transfer agent CPP in a three-necked flask containing 200 mL of tetrahydrofuran; and vacuumizing. Adding, upon completion of vacuumizing, 0.05 g of azobisisobutyronitrile initiator into the foregoing three-necked flask on condition that $N_2$ is continuously passed into the flask, and then heating up to 70° C. Stirring and reacting at 70° C. for 12 hours to obtain a crude product. Pouring the crude product into 0° C. glacial ether to settle, so that binder compound powder is obtained.

2. Preparing modified graphite, a negative electrode plate, a positive electrode plate, and a lithium-ion battery separately according to steps 2 to 5 in Embodiment 1.

Embodiments 14 to 17

Preparing modified graphite according to step 2 in Embodiment 1 by using the binder compound obtained in Embodiment 1.

The mass ratio between graphite and the binder compound is shown in Table 1 below.

TABLE 1

| Mass ratio between graphite and binder compound | | | | |
|---|---|---|---|---|
| Embodiment | 14 | 15 | 16 | 17 |
| Mass ratio between graphite and binder compound | 85:12 | 90:7 | 96:1 | 96.5:0.5 |

Comparative Embodiment

1. Preparing a Binder Compound

Dry-mixing graphite and carbon black as a conductive agent at a mass ratio of 95: 3, adding deionized water, adjusting the solid content to 45 wt% to 55 wt%, and then adding styrene-butadiene rubber (SBR) as a binder in such a way that the mass ratio between the graphite, the conductive agent, and the binder is 95: 3: 2. Stirring well to obtain a negative slurry. Subsequently, coating a current collector copper foil with the slurry in an amount of 150 mg/cm², and then performing drying, cold pressing, and slitting to make a negative electrode plate. The coating and drying conditions are: coating speed 50 m/min; and, drying temperature 130° C.

2. Preparing a positive electrode plate and a lithium-ion battery according to steps 4 to 5 in Embodiment 1.

The performance test results are described below.

A performance test is performed on the negative electrode plate and the lithium-ion battery prepared in the foregoing embodiments and comparative embodiments, and the test results are shown in Table 2.

TABLE 2

Molecular weights of binder compounds, binding force of elecrode plates, and high-temperature storage performance and cycle performance of lithium-ion batteries in Embodiments and Comparative Embodiments

| Embodiment | m/n | Molecular weight (Mn) | Binding force of negative electrode (N/m) | Capacity retention rate after storage at high temperature (180 d@60° C.) | Cycle capacity retention rate (1000 cycles@25° C.) |
|---|---|---|---|---|---|
| 1 | 1 | 500,000 | 21.6 | 97.5% | 89.6% |
| 2 | 1 | 500,000 | 18.6 | 96.4% | 87.2% |
| 3 | 1 | 500,000 | 16.5 | 95.5% | 86.3% |
| 4 | 3 | 320,000 | 17.5 | 95.9% | 86.6% |
| 5 | 3 | 770,000 | 15.3 | 93.5% | 84.6% |
| 6 | 20 | 100,000 | 13.4 | 91.7% | 82.3% |
| 7 | 10 | 1,530,000 | 16.2 | 95.4% | 86.1% |
| 8 | 9 | 370,000 | 17.3 | 95.8% | 87.0% |
| 9 | 48 | 1,890,000 | 14.8 | 93.0% | 84.2% |
| 10 | 26 | 490,000 | 16.3 | 95.3% | 86.1% |
| 11 | 33 | 50,000 | 12.4 | 91.5% | 81.7% |
| 12 | 15 | 630,000 | 14.9 | 93.1% | 84.4% |
| 13 | 13 | 980,000 | 18.4 | 96.0% | 81.3% |
| 14 | 1 | 500,000 | 25.6 | 94.9% | 85.2% |
| 15 | 1 | 500,000 | 22.3 | 96.0% | 87.1% |
| 16 | 1 | 500,000 | 19.2 | 96.8% | 88.0% |
| 17 | 1 | 500,000 | 16.7 | 95.6% | 86.4% |
| Comparative Embodiment | - | 1,200,000 | 10.5 | 90.2% | 80.4% |

As can be seen from Table 2 above, in contrast to the comparative embodiment, the binding force of the negative electrode plate according to the embodiments of this disclosure is increased significantly, and the storage performance and cycle performance of the lithium-ion battery that contains the negative electrode plate are improved significantly.

Test results of suppressing floating of the binder

Figure 5:
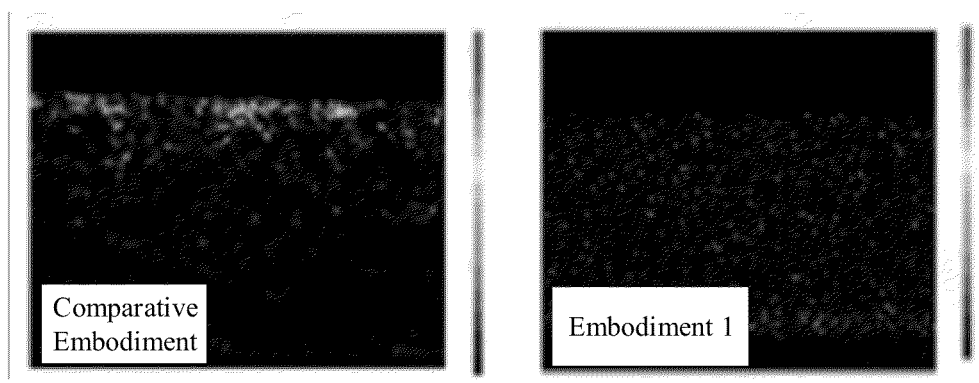
FIG. 5 is an X-ray microscopy image of a negative electrode plate according to Embodiment 1 and a comparative embodiment.

X-ray microscopy analysis is performed on the negative electrode plates prepared in Embodiment 1 and the Comparative Embodiment, and the results are shown in FIG. 5. In the drawing, white dots are the images of the binder or the binder moiety in the modified graphite according to this disclosure as rendered in the test. As can be seen from comparison between the two drawings, in the negative electrode plate prepared in the Comparative Embodiment, the binder floats up obviously. In contrast, the distribution of the binder in the negative electrode plate prepared in Embodiment 1 is obviously more uniform.

It is hereby noted that this disclosure is not limited to the foregoing embodiments. The foregoing embodiments are merely examples. Any and all embodiments with substantively the same composition or exerting the same effects as the technical ideas hereof without departing from the scope of the technical solutions of this disclosure still fall within the technical scope of this disclosure. In addition, all kinds of variations of the embodiments conceivable by a person skilled in the art and any other embodiments derived by combining some constituents of the embodiments hereof without departing from the subject-matter of this disclosure still fall within the scope of this disclosure.

What is claimed is:

1. A type of modified graphite, wherein the modified graphite comprises a graphite moiety and a binder moiety covalently linked to the graphite moiety, wherein the binder moiety possesses a structure expressed as Formula (IV'):

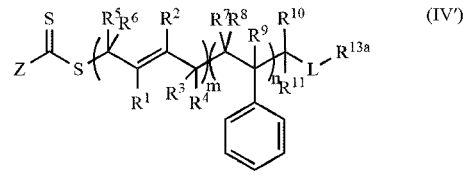

wherein, $R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, wherein substituents in the substituent-containing alkyl, alkoxyl, alkenyl, and aryl each are at least one selected from $C_1$ to $C_3$ alkyl, hydroxyl, amino, amido, cyano, carboxyl, or halogen;

$R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substituent-containing $C_2$ to $C_6$ alkenyl, or substituent-free or substituent-containing $C_6$ to $C_{20}$ aryl, wherein substituents in the substituent-containing alkyl, alkoxyl, alkylamino, alkenyl, and aryl each are at least one selected from hydroxyl, carboxyl, amino, amido, or halogen;

$R^{10}$ represents linear or branched $C_1$ to $C_{12}$ alkyl;

$R^{11}$ represents halogen or cyano;

Z is selected from linear or branched $C_1$ to $C_5$ alkylthio;

L represents linear or branched $C_1$ to $C_{12}$ alkylidene;

$R^{13a}$ represents #—COO—*, #—$CH_2O$—*, or #—NH—*, and # represents a position linked to L, and * represents a position linked to the graphite moiety; and a ratio of m to n is 1 to 100.

2. The modified graphite according to claim 1, wherein m is an integer ranging from 500 to 15,000, and n is an integer ranging from 500 to 15,000.

3. The modified graphite according to claim 1, wherein a number-average molecular weight of the binder moiety of Formula (IV') is 30,000 to 3,000,000.

4. The modified graphite according to claim 1, wherein structural units

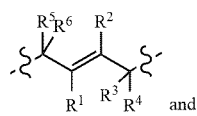

and

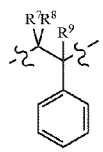

in the binder moiety are copolymerized in a random, blocked, and/or alternating manner, and optionally, in a blocked manner.

5. The modified graphite according to claim 1, wherein the binder moiety is selected from the following structures:

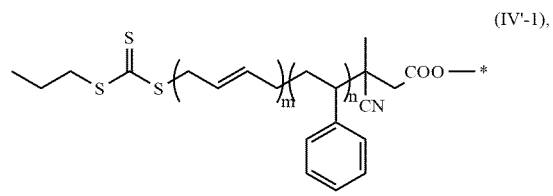
(IV'-1),

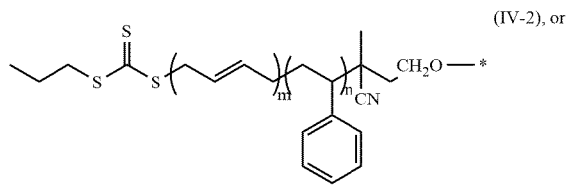
(IV-2), or

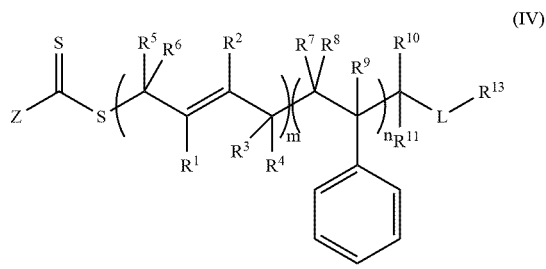
(IV'-3), wherein * represents a position at which the binder moiety is covalently linked to the graphite moiety.

6. The modified graphite according to claim 1, wherein a mass ratio between the graphite moiety and the binder moiety is 85: 12 to 96.5: 0.5.

7. The modified graphite according to claim 6, wherein a mass ratio between the graphite moiety and the binder moiety is 90: 7 to 96: 1.

8. A negative electrode plate, wherein the negative electrode plate comprises a negative current collector and a negative material layer disposed on at least one surface of the negative current collector, and the negative material layer comprises the modified graphite according to claim 1.

9. A secondary battery, wherein the secondary battery further comprises the negative electrode plate according to claim 8.

10. A battery module, comprising the secondary battery according to claim 9.

11. A battery pack, comprising at least one of the secondary battery according to claim 9.

12. An electrical device, comprising at least one of the secondary battery according to claim 9.

13. A preparation method of modified graphite, comprising:

leaving a binder compound to react with graphite in a solvent in the presence of a catalyst, wherein the binder compound possesses a structure expressed as Formula (IV):

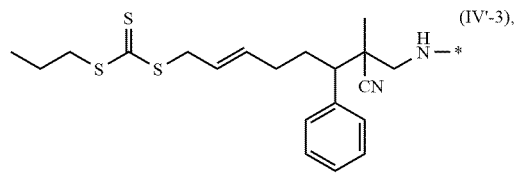
(IV)

wherein, $R^1$ to $R^6$ each are independently selected from hydrogen, halogen, cyano, hydroxyl, amino, substituent-free or substituent-containing $C_1$ to $C_6$ alkyl, substituent-free or substituent-containing $C_1$ to $C_6$ alkoxyl, substituent-free or substituent-containing $C_2$ to $C_6$ alkenyl, or substituent-free or substituent-containing $C_6$ to $C_{20}$ aryl, wherein substituents in the substituent-containing alkyl, alkoxyl, alkenyl, and aryl each are at least one selected from $C_1$ to $C_3$ alkyl, hydroxyl, amino, amido, cyano, carboxyl, or halogen;

$R^7$ to $R^9$ each are independently selected from hydrogen, hydroxyl, amino, substituent-free or substituent-containing $C_1$ to $C_6$ alkyl, substituent-free or substituent-containing $C_1$ to $C_6$ alkoxyl, substituent-free or substituent-containing $C_1$ to $C_6$ alkylamino, substituent-free or substitusubstituent-containing $C_2$ to $C_6$ alkenyl, or substituent-free or substituent-containing $C_6$ to $C_{20}$ aryl, wherein substituents in the substituent-containing alkyl, alkoxyl, alkylamino, alkenyl, and aryl each are at least one selected from hydroxyl, carboxyl, amino, amido, or halogen;

$R^{10}$ represents linear or branched $C_1$ to $C_{12}$ alkyl;

$R^{11}$ represents halogen or cyano;

Z is selected from linear or branched $C_1$ to Cs alkylthio;

L represents linear or branched $C_1$ to $C_{12}$ alkylidene;

$R^{13}$ represents carboxyl, hydroxymethyl, or amino; and a ratio of m to n is 1 to 100.

14. The preparation method according to claim 13, wherein, in the binder compound, m is an integer ranging from 500 to 15,000, and n is an integer ranging from 500 to 15,000.

15. The preparation method according to claim 13, wherein a number-average molecular weight of the binder compound is 30,000 to 3,000,000.

16. The preparation method according to claim 13, wherein structural units

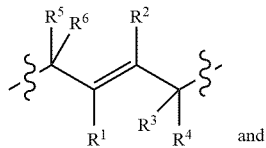

and

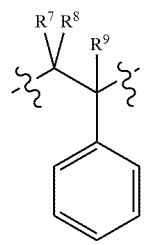

in the binder compound are copolymerized in a random, blocked, and/or alternating manne.

17. The preparation method according to claim 13, wherein the binder compound is at least one selected from:

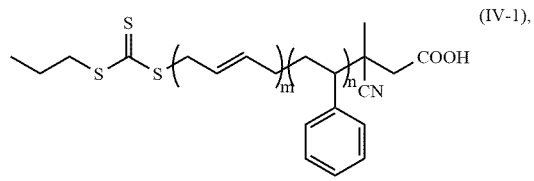

(IV-1),

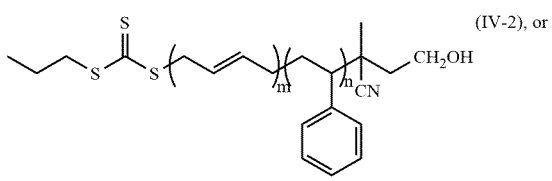

(IV-2), or

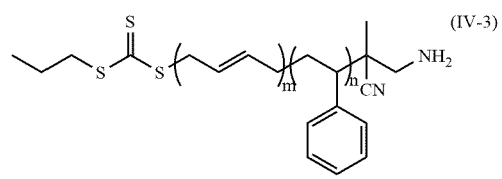

(IV-3)

18. The preparation method according to claim 13, wherein a pH value of the reaction is 4 to 7.

19. The preparation method according to claim 13, wherein a mass ratio between the graphite and the binder compound is 85: 12 to 96.5: 0.5.

20. The preparation method according to claim 13, wherein the reaction occurs at 20° C. to 40° C.

* * * * *